United States Patent [19]

Koibuchi

[11] Patent Number: 5,702,165
[45] Date of Patent: Dec. 30, 1997

[54] BEHAVIOR CONTROL SYSTEM OF VEHICLE DISTINCTIVE OF OVERSTEERED AND UNDERSTEERED CONDITIONS

[75] Inventor: Ken Koibuchi, Susono, Japan

[73] Assignee: Toyota Jidosha Kabushiki Kaisha, Aichi-ken, Japan

[21] Appl. No.: 636,695

[22] Filed: Apr. 23, 1996

[30] Foreign Application Priority Data

May 17, 1995 [JP] Japan ................................. 7-142475
May 17, 1995 [JP] Japan ................................. 7-142475

[51] Int. Cl.$^6$ ........................... B60K 28/16; B60T 8/32
[52] U.S. Cl. .................. 303/146; 303/188; 364/426.015
[58] Field of Search .................... 303/146, 147, 303/148, 188; 180/197; 364/426.015, 426.016

[56] References Cited

U.S. PATENT DOCUMENTS

| | | | |
|---|---|---|---|
| 4,898,431 | 2/1990 | Karnopp et al. | 303/146 |
| 5,063,514 | 11/1991 | Headley et al. | 303/147 X |
| 5,275,475 | 1/1994 | Hartmann et al. | 303/146 |
| 5,292,184 | 3/1994 | Takata | 303/147 |
| 5,332,300 | 7/1994 | Hartmann et al. | 303/146 |
| 5,341,297 | 8/1994 | Zomotor et al. | 303/146 X |
| 5,371,677 | 12/1994 | Ehret et al. | 303/147 X |
| 5,428,532 | 6/1995 | Yasuno | 303/146 X |
| 5,480,219 | 1/1996 | Kost et al. | 303/146 |
| 5,551,771 | 9/1996 | Akuzawa et al. | 303/188 X |

FOREIGN PATENT DOCUMENTS

| | | |
|---|---|---|
| 3-112754 | 5/1991 | Japan . |
| 5-105048 | 4/1993 | Japan .......................... 303/146 |

OTHER PUBLICATIONS

English–Language abstract of Japanese Patent Laid–open Publication 3–112754.
English–Language abstract of Japanese Patent Laid–open Publication 5–105048.

*Primary Examiner*—Robert J. Oberleitner
*Assistant Examiner*—Pamela J. Lipka
*Attorney, Agent, or Firm*—Oliff & Berridge, P.L.C.

[57] ABSTRACT

In a behavior control system of a vehicle by selective braking of individual wheels according to a target yaw moment and a target longitudinal force, it is judged if the vehicle is in an oversteered condition or an understeered condition, and an essential target of the behavior is changed over between the target yaw moment and the target longitudinal force according to whether the vehicle is in the oversteered condition or the understeered condition.

12 Claims, 7 Drawing Sheets

5,702,165

BEHAVIOR CONTROL SYSTEM OF VEHICLE DISTINCTIVE OF OVERSTEERED AND UNDERSTEERED CONDITIONS

BACKGROUND OF THE INVENTION

1. Field of the Invention

The present invention relates to a behavior control of a vehicle such as an automobile, and more particularly, to a behavior control of such a vehicle during a turning, so as to suppress a spinning caused by an oversteering or a drifting out caused by an understeering.

2. Description of the Prior Art

It is known to control the behavior of a four wheel vehicle such as an automobile during a turning by selectively braking each of the wheels, as described, in Japanese Patent Laid-open Publication 3-11274, such that, when the vehicle speed exceeds a certain limit value during a turning under a steering angle which can ensure the tire grip by the road surface corresponding to the steering angle, the wheels at the inside as well as the outside of the turn are braked to decelerate the vehicle together with a target control of the yaw rate so as to maintain the vehicle to turn within the grip limit, based upon calculations of a target value of yaw moment, a target value of longitudinal force, etc. It is described in Japanese Patent Laid-open Publication 5-105048 to selectively brake each of the wheels independently based upon the behavior of the vehicle including at least the yaw rate, such that, when the vehicle is in an oversteered condition, the share of the braking is shifted to the rear wheels, while the share of the braking is shifted to the front wheels when the vehicle in an understeered condition. Such a behavior control will be effective for suppressing a spin as well as a drift out of the vehicle.

SUMMARY OF THE INVENTION

However, in view of the nature of the spin and the drift out of the four wheel vehicle, it is contemplated that the spin of the four wheel vehicle will be most desirably controlled by placing a priority on the yaw moment applied to the vehicle by selective braking of the individual wheels without adversely affecting the operation of the vehicle, while the drift out of the vehicle will be most desirably controlled by placing a priority on the longitudinal force applied to the vehicle by selective braking of the individual wheels without adversely affecting the operation of the vehicle.

Based upon the above recognition, it is a principal object of the present invention to provide an improved behavior control system of a four wheel vehicle such as an automobile for suppressing the spin and the drift out of the vehicle which operates based upon detection of an oversteered condition or an understeered condition, with a distinction of a parameter of control target between the oversteered condition and the understeered condition of the vehicle.

In order to accomplish the above-mentioned object, the present invention proposes a behavior control system of a four wheel vehicle and a brake system for selectively braking each of the wheels, comprising:

a means for detecting a behavior of the vehicle, said behavior including a yaw moment and a longitudinal force of the vehicle;

a means for determining a target behavior of the vehicle, said target behavior including a target yaw moment and a target longitudinal force;

a means for controlling said brake system so as to approach the behavior of the vehicle to said target behavior, said control including to approach the yaw moment of the vehicle to said target yaw moment and to approach the longitudinal force of the vehicle to the target longitudinal force;

wherein said behavior control system further comprises:

a means for judging whether the behavior of the vehicle is in an oversteered condition or an understeered condition, and a means for changing over an essential target of the behavior between the target yaw moment and the longitudinal force according to whether the behavior of the vehicle judged by said vehicle behavior judgment means is in the oversteered condition or the understeered condition.

By such an arrangement, the behavior control of the vehicle is carried out differently with distinction between an oversteered condition and an understeered condition of the vehicle such that the computer control of the vehicle behavior calculating a target value of a control parameter and persuing the target value is more desirably adapted to the vehicle behavior performance throughout a wide range of operation covering the oversteered condition and the understeered condition.

In the behavior control system of the above-mentioned basic construction, said vehicle behavior detecting means may detect vehicle speed, lateral acceleration and yaw rate of the vehicle, and said essential target change over means may control said target behavior determining means so as to determine the target yaw moment substantially based upon a slip angle of the vehicle deduced by calculating a change rate of the lateral acceleration as a difference between the lateral acceleration detected by said vehicle behavior detecting means and a product of the vehicle speed and the yaw rate both detected by said vehicle behavior detecting means, calculating a lateral slip velocity by integrating on time basis the lateral acceleration change rate, and calculating the slip angle as a ratio of the lateral slip velocity to the vehicle speed, when the behavior of the vehicle is judged as being in the oversteered condition. In this case, said target behavior determining means may determine the target longitudinal force to be a constant value. Further, said target yaw moment determining means may determine the target yaw moment further based upon a change rate of the slip angle in addition to the slip angle.

On the other hand, in the behavior control system of the above-mentioned basic construction, when the behavior of the vehicle is judged as being in the understeered condition, said vehicle behavior detecting means may detect vehicle speed, steering angle and yaw rate of the vehicle, and said target behavior determining means may determine the target longitudinal speed substantially based upon a deviation of a yaw rate calculated by a time based integration of a parameter proportional to a product of the vehicle speed and the steering angle both detected by said behavior detecting means from the yaw rate detected by said behavior detecting means. In this case, said target behavior determining means may determine the target yaw moment to be a constant value. Further, said parameter proportional to the product of the vehicle speed and the steering angle may be modified by square of the vehicle speed such that said parameter is increased with an additive increment substantially proportional to the square of the vehicle speed.

In the behavior control system according to the present invention, said target behavior determining means may comprise a means for developing a coordinate of the yaw moment and the longitudinal force, a means for determining a grip area in said coordinate inside of which the tire grip by the road surface is ensured, and a means for modifying a target point of the target yaw moment and the target longitudinal force on said coordinate so as to be in said grip area, when not in said grip area, said target point modifying means modifying the target point by putting priority on the target yaw moment than on the target longitudinal force when the vehicle behavior is in the oversteered condition.

Or, alternatively, in the behavior control system according to the present invention, said target behavior determining means may comprise a means for developing a coordinate of the yaw moment and the longitudinal force, a means for determining a grip area in said coordinate, and a means for modifying a target point of the target yaw moment and the target longitudinal force on said coordinate so as to be in said grip area, when not in said grip area, said target point modifying means modifying the target point by putting priority on the target longitudinal force than on the target yaw moment when the vehicle behavior is in the understeered condition.

Further, considering that the side force available for the wheel from the road surface decreases according to increase of the braking force applied to the wheel as described in detail hereinbelow, in the behavior control system according to the present invention, said target behavior determining means may comprise a means for developing a coordinate of the yaw moment and the longitudinal force, a means for determining an area in said coordinate contracted to be substantially one third of the grip area with respect to the yaw moment and the longitudinal force, respectively, and a means for modifying a target point of the target yaw moment and the target longitudinal force on said coordinate so as to be in said contracted area, when not in said contracted area, said target point modifying means modifying the target point by putting priority on the target longitudinal force than on the target yaw moment when the vehicle behavior is in the understeered condition.

Further, in order to ensure full effectiveness of the control, in the behavior control system according to the present invention, in general, said vehicle behavior detecting means may comprise a means for detecting a friction radius of each of the wheels, and a means for sharing a braking force applied to front and rear left wheels of the vehicle to a braking force applied to the front left wheel and a braking force applied to the rear left wheel at a sharing ratio of the friction radius of the front left wheel versus the friction radius of the rear left wheel, and a means for sharing a braking force applied to front and rear right wheels of the vehicle to a braking force applied to the front right wheel and a braking force applied to the rear right wheel at a sharing ratio of the friction radius of the front right wheel versus the friction radius of the rear right wheel, particularly when the vehicle behavior is in the understeered condition.

However, with respect to the wheels at the outside of the turn, it is more desirable that said vehicle behavior detecting means comprises a means for detecting a friction radius of each of the wheels, and a means for sharing a bring force applied to front and rear wheels of the vehicle at the inside of a turn thereof to a braking force applied to the front wheel at the inside of the turn and a bring force applied to the rear wheel at the inside of the turn at a sharing ratio of the friction radius of the front wheel at the inside of the turn versus the friction radius of the rear wheel at the inside of the turn, and a means for sharing a braking force applied to front and rear wheels of the vehicle at the outside of the turn thereof to a braking force applied to the front wheel at the outside of the turn and a braking force applied to the rear wheel at the outside of the turn at a sharing ratio of the friction radius of the front wheel at the outside of the turn versus a product of the friction radius of the rear wheel at the outside of the turn and $(t/2)/(b^2+t^2/4)^{1/2}$, wherein t is a wheel base of the rear wheels and b is a distance between a mass center of the vehicle and a rear wheel axis, particularly when the vehicle behavior is in the oversteered condition.

In the following, some analyses will be made to give the basis of the conditions specified by the present invention.

To estimate the side force available by the frictional contact between the wheel and the road surface, FIG. 1 shows a simplified model of a vehicle having a pair of left and right wheels 100in and 100out in a plan view. It is assumed that that the vehicle is running upward in the figure, turning to the left, so that the left wheel 100in is the wheel at the inside of the turn and the right wheel 100out is the wheel at the outside of the turn. Denoting the mass of the vehicle body by "m", the height of the mass above the road surface by "h", the tread or the distance between the two wheels by "t", the lateral acceleration due to the left turn by "Gy", and the gravitational acceleration by "g", the contact load Win and Wout of the left and right wheel on the road surface are respectively expressed as follows:

$$Win=m*g/2-m*Gy*h/t \quad (1)$$

$$Wout=m*g/2+m*Gy*h/t \quad (2)$$

When the friction coefficient to act between the wheel and the road surface is μ, the maximum side forces applicable to the wheels at the inside and the outside of the turn from the road surface based upon the friction therebetween are Finmax=μ*Win and Fourmax=μ*Wout, respectively. The amount such as Finmax and Foutmax is, as a parameter, cared "friction radius", representing the maximum side force available for a wheel to be gripped against the side sliding by the frictional contact with the road surface in any direction around the contact point. Circles 102in and 102out in FIG. 1 are the circles drawn with such a friction radius for the wheels at the inside and the outside of the turn. At the outside of the turn a relatively large braking force Four is available for the wheel 100out within the friction circle 102out, while at the inside of the turn a less braking force Fin is available for the wheel 100in within the friction circle 102in. If a spin moment M is generated in the vehicle body, it can be held against by applying unbalanced braking forces such as Fin and Fout to the wheels at the inside and the outside of the turn.

FIG. 2 shows a diagram designed in relation with the model of FIG. 1 such that the ordinate expresses a longitudinal force Fx applied to the vehicle body from the wheels, while the abscissa expresses a yaw moment M applied to the vehicle body from the wheels. In FIG. 2, as noted in the diagram, the lower half of the abscissa is a braking region, while the upper half of the abscissa is a driving region. Similarly, a yaw moment in the right half region of the ordinate prompts the left turn of the vehicle body, while a yaw moment in the left half region of the ordinate suppresses the left turn of the vehicle. Then the axes of coordinate of the braking forces exerted by the left and right wheels will extend diagonal to the coordinate of the longitudinal force Fx and the moment M as shown by Fin and Fout in the diagram, and there will be defined a rectangular area P1-P2-P3-P4 according to each instant running condition of the vehicle, inside of which the side grip of the wheels from the road surface based upon a frictional contact therebetween is ensured, wherein point P1 is a totally neutral point; P2 is a point of Fin=Finmax & Four=0; P3 is a point of Fin=Finmax & Fout=Foutmax; and P4 is a point of Fin=0 & Fout=Foutmax.

It will be appreciated that if the target yaw moment and/or the target longitudinal force of the vehicle behavior control is in said rectangular grip area, the control of the yaw moment and/or the longitudinal force toward the target value thereof by a selective apply of braking to each wheel may be instantly started. However, if the target yaw moment and/or the target longitudinal force is out of said rectangular grip area, the behavior control can not be carried out such that the braking force for the target value is instantly applied to either or both of the inside and outside wheels.

In general, when a vehicle is in an oversteered condition (spinning condition), it should be more effective for stabilizing the vehicle that the vehicle is given an anti-spin moment. Therefore, according to the present invention, when the vehicle is in an oversteered condition, the application of a target yaw moment is put priority in controlling the braking force of the left and right wheels. For example, when the target point is a point such as T1 located in an area defined on the upper side of the line P1–P4 and hatched in FIG. 2, the target point T1 is modified to a point T1' shifted from point T1 vertically downward in the diagram to be in the grip area, thus maintaining the target yaw moment, before the braking control of the wheels is started with the target point T1'. For the target point T1', the wheel at the outside of the turn only is braked.

On the other hand, when the vehicle is in an understeered condition (drifting out condition), it should be more effective for stabilizing the vehicle that the vehicle is decelerated so that the centrifugal force acting at the vehicle is attenuated, together with application of a yaw moment. Therefore, according to the present invention, when the vehicle is in an understeered condition, the attainment of a target longitudinal force is put priority in controlling the braking force of the left and right wheels. For example, when the target point is a point as such T2 or T3 located in an area defined on the rightside of the line P2–P3 and also hatched in FIG. 2, the target point T2 or T3 is modified to be point T2' or T3' shifted horizontally leftward from the point T2 or T3 to be in the grip area, thus maintaining the target longitudinal braking force, before the braking control of the wheels is started with the target point T2' or T3'. For the target point T2' or T3', both of the wheels at the inside and the outside of the turn are braked from the beginning, so that the vehicle is decelerated, while a yaw moment to prompt the turn of the vehicle is simultaneously generated.

Although it would be convenient to calculated the target point to be in the grip area or in the two areas hatched outside of the grip area in FIG. 2 so that at least one of the calculated target yaw moment and longitudinal force is directly usable, the target point may be calculated to be more faithful to the running condition of the vehicle such as T4–T9, so that the braking control of the wheels is actually started with a modification of these target points to, for example, points T4'–T9', respectively.

When the vehicle is a front drive front steering type vehicle, the diagram of FIG. 2 may be modified as shown in FIG. 3, wherein the grip area is expanded to include an area of the wheel driving defined by points P1', P2' and P4'. Driving the front wheels is effective to suppress an oversteer.

With reference to the estimation of the friction radius, there is another aspect to be noted. That is the fact that the side force available the wheel based upon the frictional contact with the road surface decreases according to increase of the braking force. FIG. 4 diagrammatically shows a right half portion of a four wheel vehicle. It is assumed that the vehicle is running upward in the figure while turning to the left. In such a condition, if no braking is applied to the wheel 100rout, the side force applied to the rear wheel 100rout from the road surface is such that is shown by an arrow Fys in the figure, directed at right angle to the center plane of the wheel and saturated to the grip limit expressed by the friction circle 102rout. When a braking force is applied to the rear wheel 100rout, the side force is combined with the longitudinal braking force to provide a combined force Fr which turns from the orientation at right angle to the wheel center plane toward the longitudinal braking force. Since the combined resultant force Fr is limited within the friction circle 102rout, the side force cannot but decrease from Fys to Fy.

In this connection, in view of such a reduction of the side force caused by the braking, it will be most effective for the braking force applied to the rear wheel at the outside of the turn that its magnitude is such that the combined force Fr acts at right angle to the straight line connecting the wheel contact point P and the mass center O of the vehicle, i.e. the maximum braking force applied thereto is $Fxrmax = \mu r * Wr * t/2/(b^2 + t^2/4)^{1/2}$.

BRIEF DESCRIPTION OF THE DRAWINGS

In the accompanying drawings.

DESCRIPTION OF THE EMBODIMENTS

In the following, the present invention will be described in more detail in the form of some embodiments with reference to the accompanying drawings.

Figure 5:
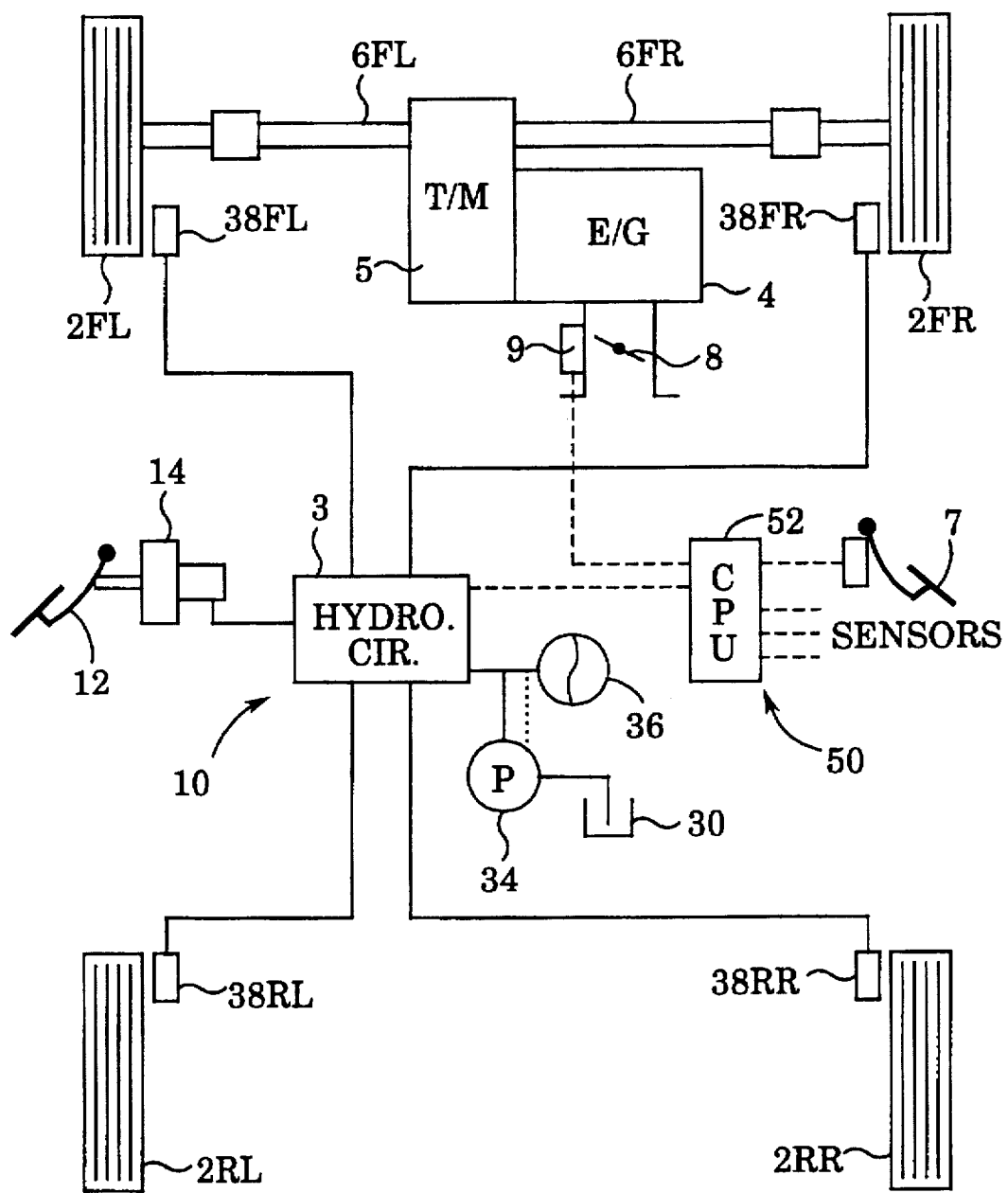
FIG. 5 is a diagrammatic view of a four wheel vehicle incorporating an embodiment of the vehicle behavior control system according to the present invention.

In FIG. 5, 2FL, 2FR, 2RL and 2RR show front left, front right, rear left and rear right wheels of a four wheel vehicle, adapted to be braked by wheel cylinders 38FL, 38FR, 38RL and 38RR, respectively, when selectively supplied with a hydraulic pressure from a hydraulic circuit 3 of a brake system generally designated by 10. As described in detail hereinbelow, the hydraulic circuit 3 is normally placed under the control of a brake pedal 12 operated by a driver but in certain emergency conditions it is placed under the control of an electric control device generally designated by 50 and including a microcomputer 52.

The front left and front right wheels 2FL and 2FR are driven steered wheels adapted to be steered by a steering system of a conventional type not shown in the figure, while they are driven by an engine 4 through a transmission 5 and driving shafts 6FL and 6FR, respectively. The output of the engine 4 is controlled by a throttle valve 8 operated by an actuator 9 normally placed under the control of an accelerator pedal 7 operated by the driver through the electric control device 50 which, in certain emergency conditions, overrides the driver's operation of the accelerator pedal.

Figure 6:
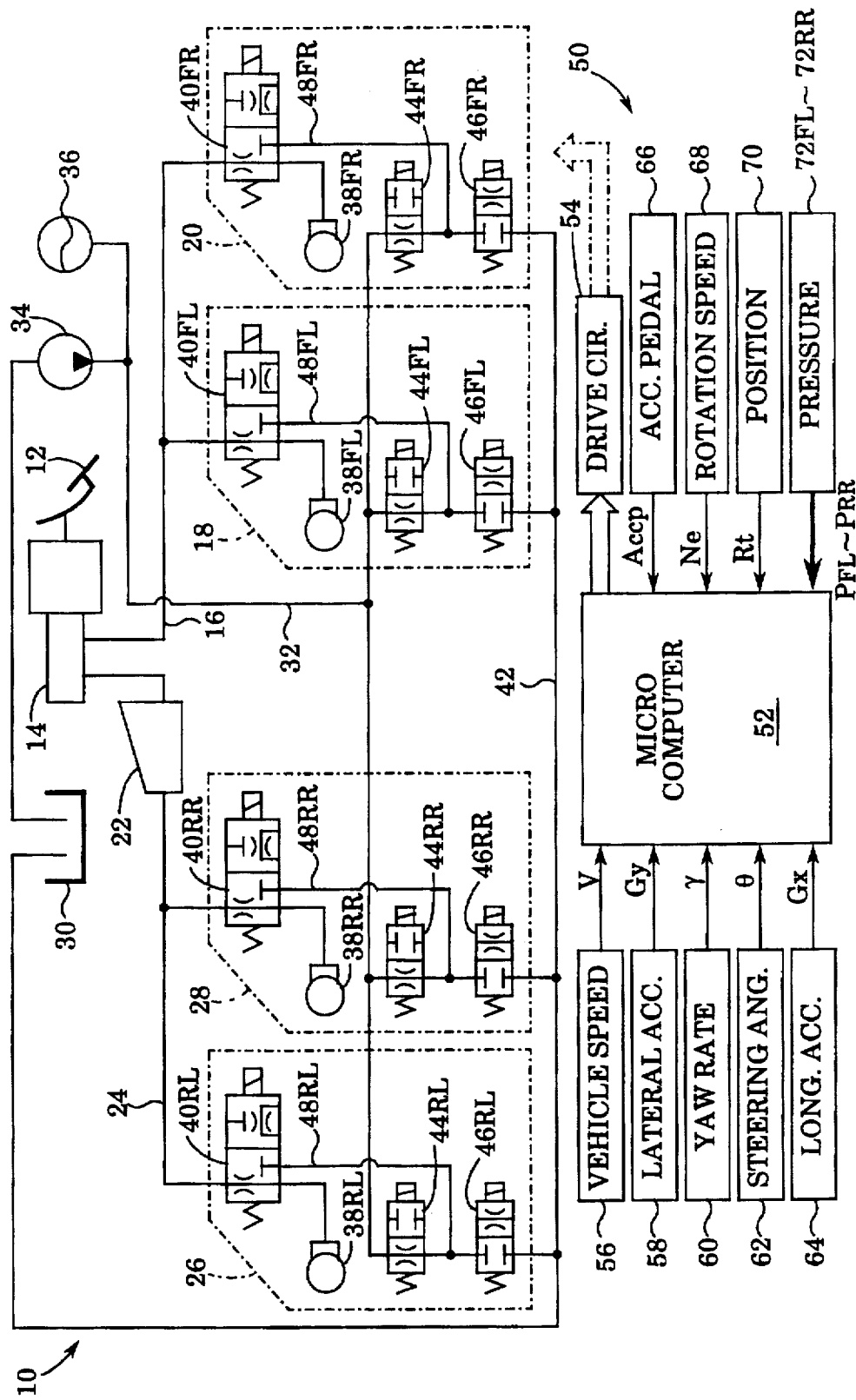
FIG. 6 is a diagram showing the braking system and the electric control system forming an essential part of the vehicle behavior control system shown in FIG. 6.

As shown in detail in FIG. 6, the hydraulic circuit 3 of the brake system 10 includes a master cylinder 14 which delivers a hydraulic fluid from its first and second ports in accordance with a stepping-in operation of the brake pedal 12, the first port being connected with a passage 16 leading to brake hydraulic pressure control means 18 and 20 for the front left and front right wheels, while the second port is connected with a passage 24 including a proportional valve 22 and leading to brake hydraulic pressure control means 26 and 28 for the rear left and rear right wheels. The brake hydraulic circuit 3 further includes a reservoir 30 and an oil pump 34 which takes in the hydraulic fluid from the reservoir and delivers it under a raised pressure to a high pressure passage 32 leading to the brake hydraulic pressure control means 18, 20, 26 and 28. An accumulator 36 is connected to a middle portion of the high pressure passage 32.

The brake hydraulic pressure control means 18, 20, 26 and 28 include 3-port/2-position change over type electromagnetic control valves 40FL, 40FR, 40RL and 40RR adapted to change over the connection of the wheel cylinders 38FL, 38FR, 38RL and 38RR between a normal driver's control by the brake pedal 12 and an emergency automatic control described in detail hereinbelow, normally open type electromagnetic on-off valves 44FL, 44FR, 44RL and 44RR, and normally closed type electromagnetic on-off valve 46FL, 46FR, 46RL and 46RR, respectively, wherein each set of the normally open type on-off valve and the normally closed type on-off valve are connected in series between the high pressure passage 32 connected with the delivery port of the pump 34 and a low pressure passage 42 connected with the reservoir 30. A middle point of each serial connection of the normally open on-off valve and the normally closed on-off valve is connected with each corresponding 3-port/2-position change over type control valve by a passage such as 48FL, 48FR, 48RL or 48RR.

Each of the change over control valves 40FL and 40FR is changed over between its first position shown in the figure for connecting the front brake hydraulic fluid passage 16 with each of the front wheel cylinders 38FL and 38FR, while isolating each of the wheel cylinders 38FL and 38FR from the corresponding connection passages 48FL or 48FR, and a second position for isolating each of the wheel cylinders 38FL and 38FR from the passage 16 while connecting each of the wheel cylinders 38FL and 38FR with the corresponding connection passage 48FL or 48FR. Similarly, each of the change over control valves 40RL and 40RR is changed over between a first position for connecting each of the rear wheel cylinders 38RL and 38RR with the rear brake pressure control passage 24, while isolating it from the corresponding connection passage 48RL or 48RR, and a second position for isolating each of the rear wheel cylinders 38RL and 38RR from the passage 24 while connecting it with a corresponding connection passage 48RL or 48RR. When the change over valve 40FL, 40FR, 40RL or 40RR is changed over to said second position thereof, if the corresponding on-off valve 44FL, 44FR, 44RL or 44RR is opened, while the corresponding on-off valve 46FL, 46FR, 46RL or 46RR is closed as shown in the figure, the corresponding wheel cylinder 38FL, 38FR, 38RL or 38RR is supplied with the high pressure of the passage 32, so as to apply a braking action to the corresponding wheel. Conversely, with the change over control valve 40FL, 40FR, 40RL or 40RR being in said second position, if the corresponding on-off valve 44FL, 44FR, 44RL or 44RR is closed, while the corresponding on-off valve 46FL, 46FR, 46RL or 46RR is opened, the corresponding wheel cylinder is connected with the return passage 42, so that the braking action applied to the corresponding wheel is decreased. As a matter of course, when both of the on-off valve 44FL, 44FR, 44RL or 44RR and the corresponding on-off valve 46FL, 46FR, 46RL or 46RR are closed with the corresponding change over control valve 40FL, 40FR, 40RL or 40RR being shifted to said second position, the hydraulic pressure of the corresponding wheel cylinder is maintained at a value attained at the instant when both of the on-off valves were closed.

Thus, it will be understood that when any of the change over valves 40FL–40RR is shifted to said first position, the brake system 10 apply a braking force to a corresponding wheel according to the stepping-in operation of the brake pedal 12 by the driver, while when any of the change over control valve 40FL–40RR is shifted to said second position, the brake system 10 applies a braking action to the corresponding wheel under the automatic control of the on-off valves 44FL–44RR and 46FL–46RR, over riding the brake control by the driver.

Figure 1:
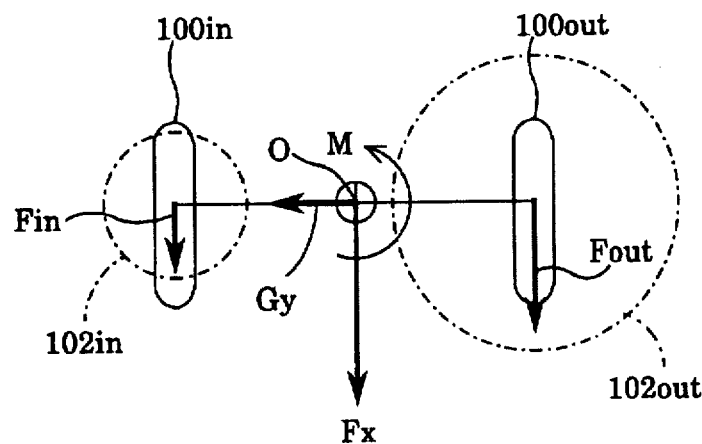
FIG. 1 shows a diagrammatic model of a vehicle having a pair of wheels, shown in a state making a left turn.

The valves 40FL–40RR, 44FL–44RR and 46FL–46RR are controlled by the electric control device 50 as described in detail hereinbelow. The electric control device 50 includes the microcomputer 52 and a drive circuit 54. Although not shown in detail in FIGS. 1 and 2, the microcomputer 52 may be of a conventional general construction including a central processing unit (CPU), a read only memory (ROM), a random access memory (RAM), an input port means, an output port means and a unidirectional common bus interconnecting these constructional elements.

The microcomputer 52 is supplied with various data, such as vehicle speed V from a vehicle sensor 56, lateral acceleration Gy of the vehicle body from a lateral acceleration sensor provided substantially at the mass center of the vehicle, yaw rate $\gamma$ of the vehicle body from a yaw rate sensor 60, steering angle $\theta$ from a steering angle sensor 62, longitudinal acceleration Gx of the vehicle body from a longitudinal acceleration sensor 64 provided substantially at the mass center of the vehicle body, stepping-in amount Accp of the accelerator pedal 7 from an accelerator pedal 66, engine rotation speed Ne from an engine rotation sensor 68, transmission ratio Rt (shift position) of the transmission 5 from a shift position sensor 70, and braking pressures $P_{FL}$–$P_{RR}$ of the wheel cylinders 38FL, 38FR, 38RL and 38RR from pressure sensors 72FL, 72FR, 72RL and 72RR.

The ROM of the microcomputer 52 stores various control flows and maps as described hereinbelow. The CPU makes various calculations based upon the data received from the above-mentioned sensors according to the control flows and maps stored in the ROM with a help of the RAM, judges whether the behavior of the vehicle is in the oversteered condition or in the understeered condition, and based upon the judgment, calculates a target yaw moment Mt and a target longitudinal force Ft, and based upon the calculated target yaw moment Mt and the target longitudinal force Ft, calculates the braking forces to be applied to the respective wheels for stabilizing the turning behavior of the vehicle.

Figure 7:
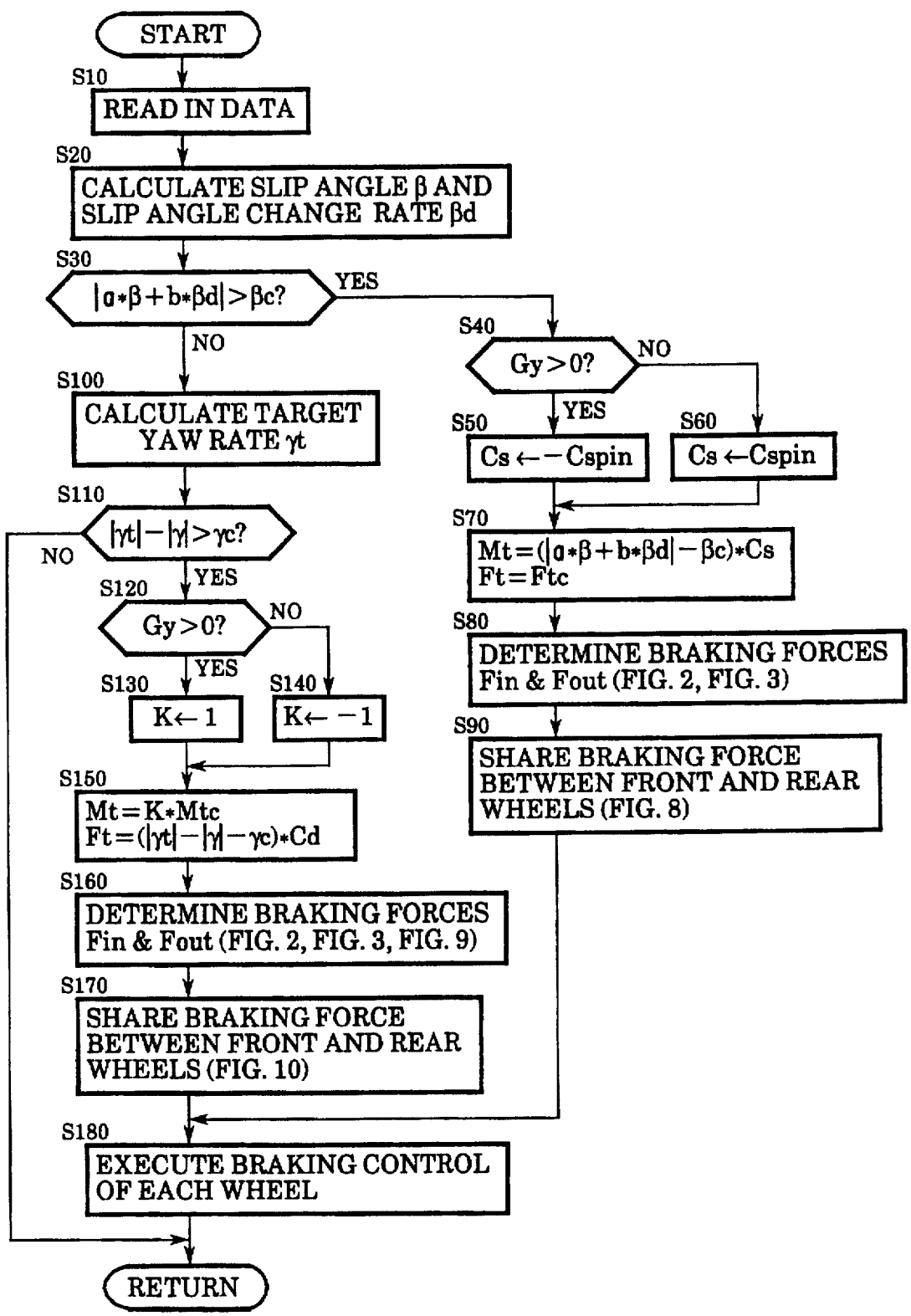
FIG. 7 is a general flowchart showing the control operation of the vehicle behavior control system according to the present invention.

Referring to FIG. 7 showing the general flowchart, the vehicle behavior control of the present invention will be described. The control according to this flowchart is repeated at a predetermined time interval as started by a closure of the ignition switch not shown in the figure.

First, in step 10, data such as the vehicle speed V detected by the vehicle speed sensor 56 and the other sensors are read in, and then, in step 20, a lateral slip acceleration Vyd of the vehicle is calculated as a difference between the lateral acceleration Gy detected by the lateral acceleration sensor 58 and a calculated lateral acceleration which is the product of the vehicle speed V and the yaw rate $\gamma$, as Vyd=Gy−V*$\gamma$, then Vyd is integrated to obtain a lateral slip velocity Vy, then a slip angle $\beta$ of the vehicle body is calculated as the ratio of the lateral slip velocity Vy to the longitudinal velocity Vx. Further, the slip angle $\beta$ is differentiated to obtain a slip angle change rate $\beta$ d of the vehicle body.

In step 30, taking a and b as each being predetermined positive constants, it is tested if the absolute value of the sum a*$\beta$+b*$\beta$ d is greater than a threshold value $\beta$c. If the answer of this test is yes, it is judged that the vehicle is spinning. If the vehicle is spinning, then the control process proceeds to step 40, while if the answer is no, then the control process proceeds to step 100.

When it was judged that the vehicle is spinning, the vehicle behavior control according to the present invention is carried out primarily to generate an anti-spin moment. In step 40, it is tested if the lateral acceleration Gy is positive, that is, if the vehicle is turning leftward, and if the answer is yes, then in step 50, a factor Cs prepared for controlling the brakes from the view point of primarily generating an anti-spin moment is set to −Cspin, while if Gy is not positive, then in step 60 Cs is set to Cspin. Then in step 70, the target yaw moment Mt is calculated as follows:

$$Mt=(a*\beta+b*\beta d|-\beta c)*Cs$$

The target longitudinal force Ft is set to a constant value Ftc which may be a relatively low value, including zero.

Figure 2:
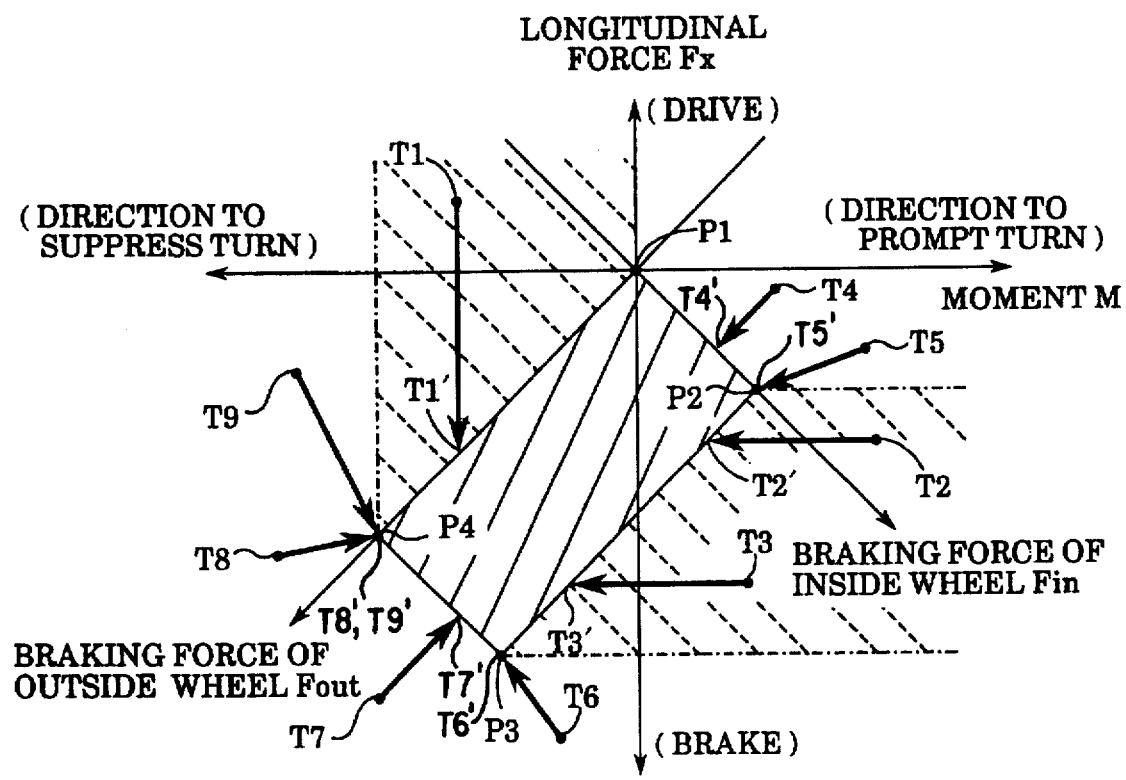
FIG. 2 shows a diagram coordinating the yaw moment M, the longitudinal force Fx, and the braking forces Fin and Four, and showing how to control the braking forces for the wheels at the inside and the outside of the turn when the vehicle behavior is in an oversteered or an understeered condition.

In step 80, according to the same principle as the formulae (1) and (2), the loads Win and Wout on the wheels at the inside and the outside of the turn are calculated, respectively, then based upon the friction coefficient $\mu$ estimated at the instant, the friction radius Finmax for the wheels at the inside of the turn and the friction radius Foutmax for the wheels at the outside of the turn are calculated, and then the diagram of FIG. 2 is set out, with the grip area being defined by point P1 of neutral; point P2 of Fin=Finmax & Fout=0; point P3 of Fin=Finmax & Fout=Foutmax; and point P4 of Fin=0 & Fout=Foutmax.

Figure 3:
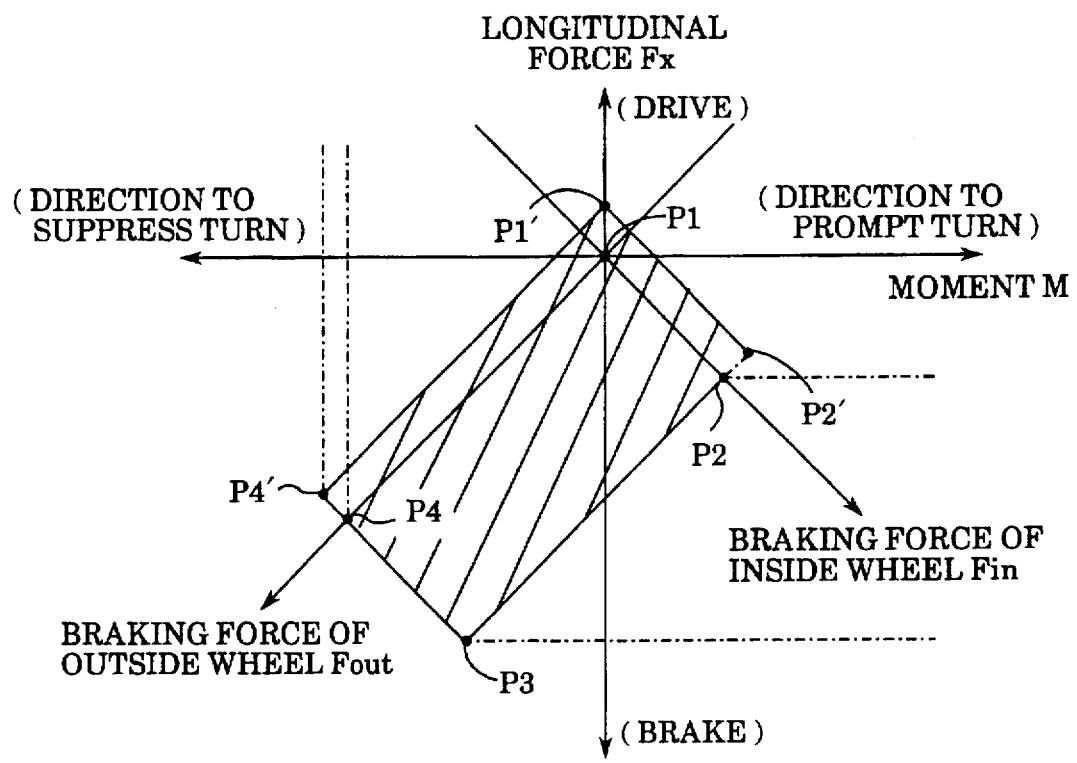
FIG. 3 shows a diagram similar to that of FIG. 2, modified for a front drive/steering vehicle.
Figure 4:
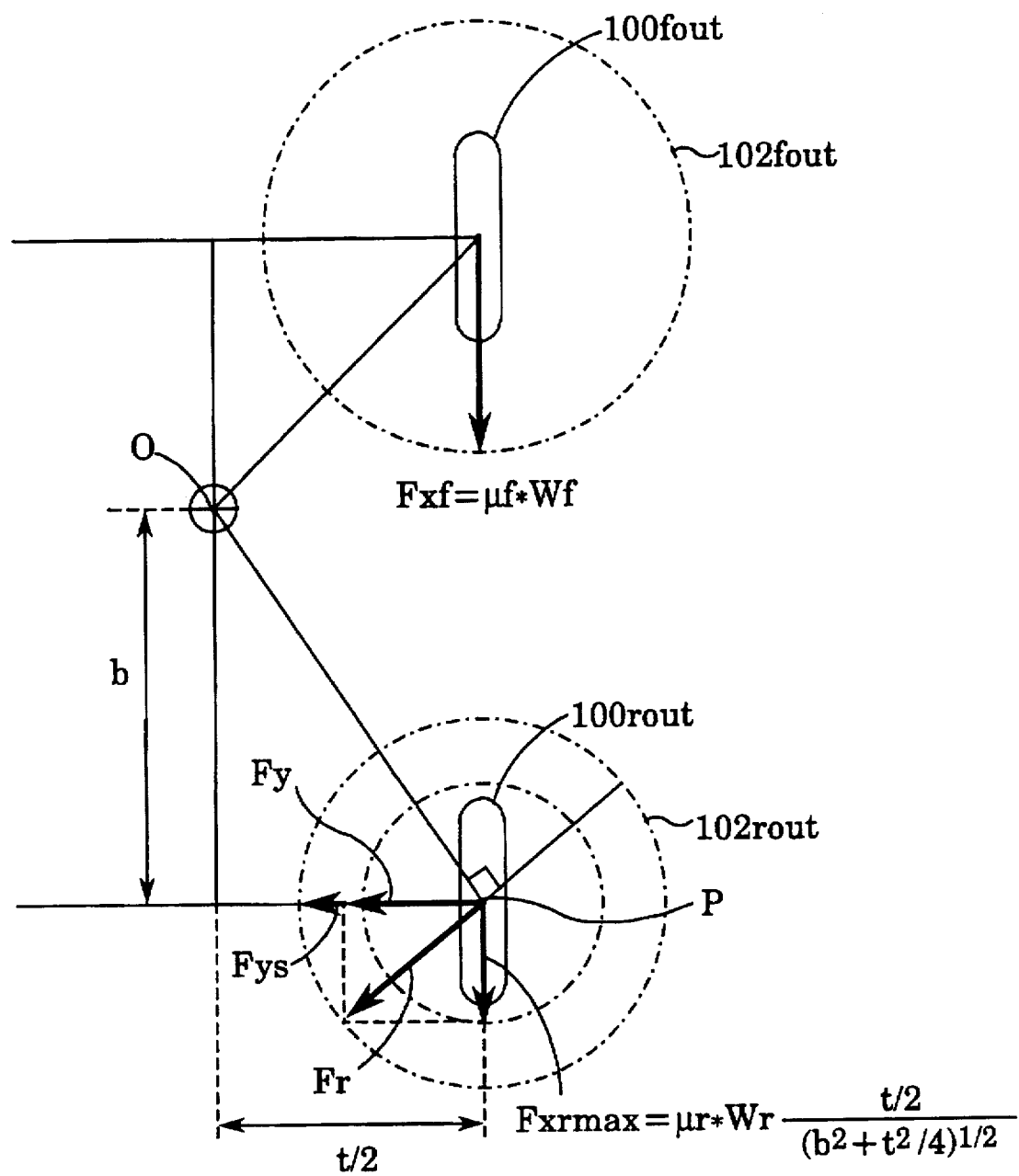
FIG. 4 shows a diagrammatic model of a four wheel vehicle, shown in a condition of making a left turn.

When the vehicle is a front drive/steering vehicle, the diagram of FIG. 3 is set out, further based upon the stepping-in amount Accp of the acceleration pedal 7 and the engine rotation speed Ne, according to a map not shown in the figure, such that the output torque Te of the engine is calculated, then based upon the engine output torque Te and the shift position of the transmission or the transmission ratio Rt, according to a map not shown in the figure, the driving forces Fdin and Fdout of the wheels at the inside and the outside of the turn are calculated, and then the points P1', P2' and P4' of the diagram of FIG. 4 are determined.

Based upon the diagram of FIG. 2 or 3, thus obtained, the target yaw moment Mt and the target longitudinal force Ft are modified, if necessary, in the manner described with reference to FIG. 2, such that the target point is ensured in the grip area, so as to obtain a target braking force Fin to be applied to the wheel (in fact, front and rear wheels) at the inside of the turn and a target braking force Fout applied to the wheel (in fact, also front and rear wheels) at the outside of the turn.

Figure 8:
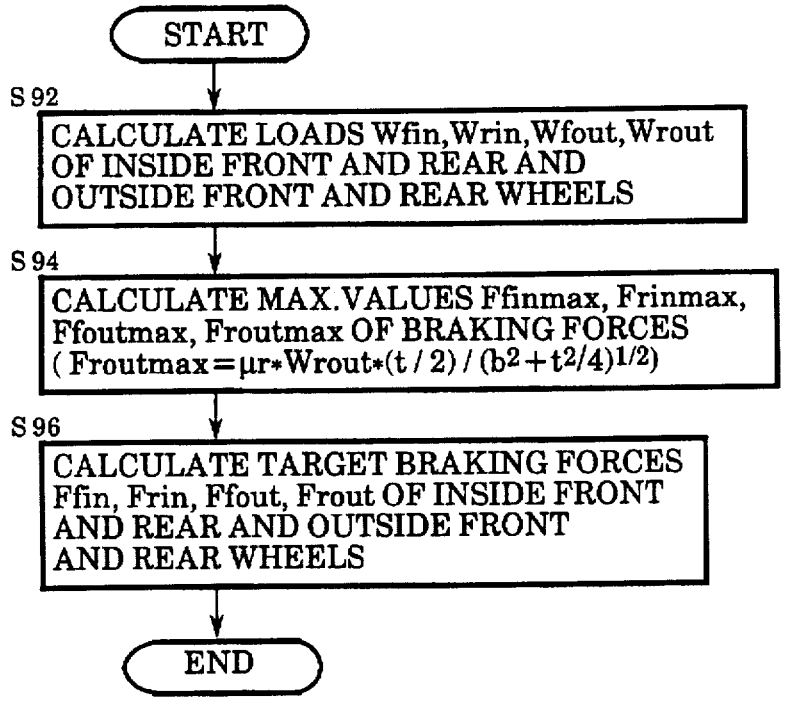
FIG. 8 is a flowchart showing a subroutine for sharing the braking force between the front wheels and the rear wheels in step 90 of the general flowchart.

Then, in step 90, according to the subroutine shown in FIG. 8, each of the target braking forces at the inside and the outside of the turn is shared for the front and the rear wheel.

First, in step 92, the loads Wfin and Wrin of the front and the rear wheel at the inside of the turn and the loads Wfout and Wrout of the front and the rear wheel at the outside of the turn are calculated as follows:

$$Wfin=\alpha*m*g/2-m*Gx*h-\delta*m*Gy*h/t$$

$$Wfout=\alpha*m*g/2-m*Gx*h+\delta*m*Gy*h/t$$

$$Wrin=(1-\alpha)*m*g/2+m*Gx*h-(1-\delta)*m*Gy*h/t$$

$$Wrout=(1-\alpha)*m*g/2+m*Gx*h+(1-\delta)*m*Gy*h/t$$

wherein, m is the total mass of the vehicle, $\alpha$ is the mass distribution ratio for the front wheels, g is the gravitational acceleration, Gx is the longitudinal acceleration of the vehicle, Gy is the lateral acceleration of the vehicle, $\delta$ is the roll stiffness distribution ratio for the front wheels, and h is the height of the center of the mass m from the road surface.

In step 94, the maximum side forces Ffinmax and Frinmax available for the front and the rear wheel at the inside of the turn by the frictional contact thereof with the road surface and the maximum side forces Ffoutmax and Froutmax available for the front and the rear wheel at the outside of the turn by the frictional contact thereof with the road surface, i.e. the friction radius of the respective wheels, are calculated as follows:

$$Ffinmax=\mu f*Wfin$$

$$Ffoutmax=\mu f*Wfout$$

$$Frinmax=\mu r*Wrin$$

$$Froutmax=\mu r*Wrout*(\tfrac{1}{2})(b^2+t^2/4)^{1/2}$$

wherein, $\mu$ f and $\mu$ r are the friction coefficient of the contact between the front and the rear wheel and the road surface, respectively, and b and t are the geometrical parameters shown in FIG. 4. It is to be noted that the rear wheel at the outside of the turn is specifically modified in view of the condition described with reference to FIG. 4. The friction coefficients $\mu$ f and $\mu$ r may be estimated to be a common value $\mu$.

Based upon Ffinmax vs. Frinmax, the braking force Fin for the wheel at the inside of the turn is shared into Ffin and Frin for the front and rear wheels at the inside of the turn, respectively, and based upon Ffoutmax vs. Froutmax, the braking force Fout for the wheel at the outside of the turn is shared into Ffout and Frout for the front and rear wheels at the outside of the turn, as follows:

$$Ffin=Fin*Ffinmax/(Ffinmax+Frinmax)$$

$$Frin=Fin*Frinmax/(Ffinmax+Frinmax)$$

$$Ffout=Fout*Ffoutmax/(Ffoutmax+Froutmax)$$

$$Frout=Fout*Froutmax/(Ffoutmax+Froutmax)$$

Then, in step 180, based upon Ffin, Frin, Ffout and Frout, the brakes of the respective wheels are automatically controlled, such that the change over control valves 40FL-40RR are changed over to said second position, to isolate the corresponding wheel cylinders 38FL-38RR from the front and rear passages 16 and 24, while placing them under the control of the corresponding series connection of on-off valves 44FL-44RR and 46FL-46RR operated by the microcomputer 52.

On the other hand, when it was judged in step 30 that the vehicle is not spinning out, the vehicle behavior control according to the present invention is carried out primarily to suppress the drifting out of the vehicle, so as to let the yaw rate of the vehicle trace the operation of the steering wheel by the driver. So, when the control process proceeds to step 100 from step 30, a target yaw rate is calculated as follows:

$$\gamma t = V^* \theta^* (1+Kh^*V^2)^* L/(1+T^*s)$$

wherein V is the vehicle speed, θ is the steering angle, L is the wheel base of the vehicle, Kh is a factor for the stability purpose, T is a time constant for integration, and s is the Laplace operator.

In step 110, it is tested if the difference of the absolute value of the target yaw rate γt from the absolute value of the actual yaw rate γ is greater than a predetermined threshold value γc. If the answer is yes, it is judged that the vehicle is substantially drifting out, while if the answer is no, it is judged that the vehicle is not drifting substantially out. If the answer is no, the control process returns to step 10, whereas if the answer is yes, the control process proceeds to step 120.

In step 120, it is tested if the lateral acceleration Gy is positive, that is, if the vehicle is making a left turn, and if the answer is yes, the control process proceeds to step 130, wherein a factor K is set to 1, whereas if the answer is no, the control process proceeds to step 140, wherein the factor K is set to −1.

In step 150, the target yaw moment Mt is set to K*Mtc, wherein Mtc is a constant. In this case, the target yaw moment Mt may be a relatively low value, including zero.

On the other hand, the target longitudinal force Ft is calculated as follows:

$$Ft = (|\gamma t| - |\gamma| - |\gamma c|)^* Cd$$

wherein Cd is a factor determined for suppressing the drifting out of the vehicle.

Figure 9:
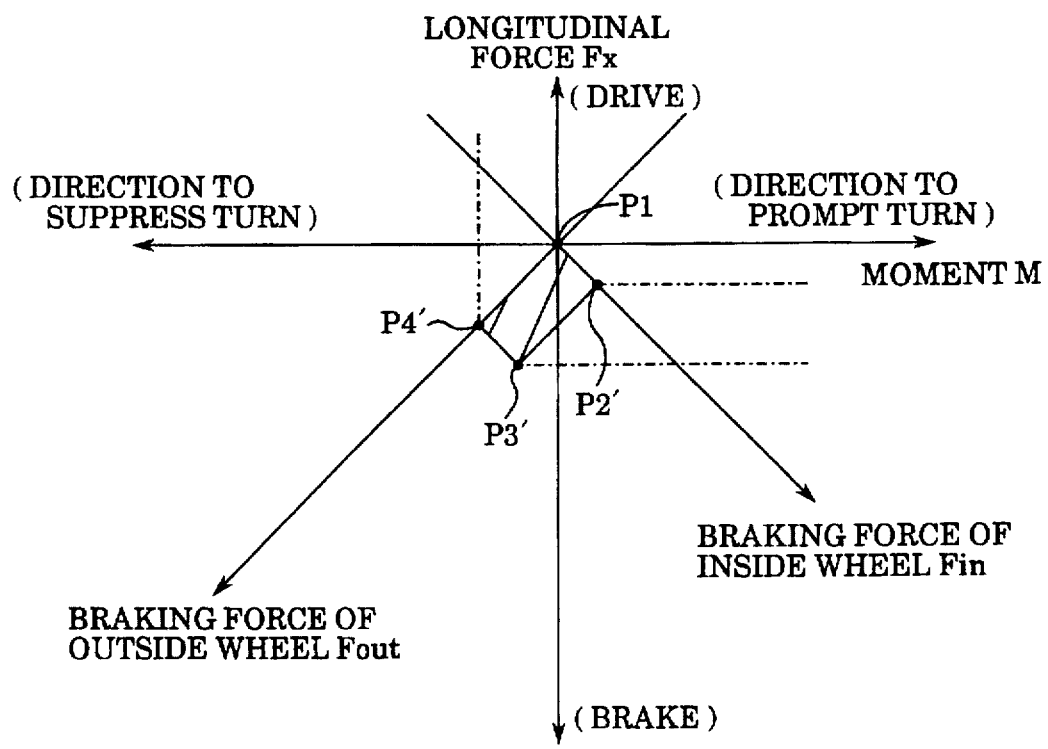
FIG. 9 shows a diagram similar to that of FIG. 2, coordinating the yaw moment M, the longitudinal force Fx, and the braking forces Fin and Fout, particularly designed for modifying thee braking forces applied to the wheels at the inside and the outside of the turn when the vehicle is in an under steer condition, in consideration of decrease of the side force due to braking of the wheel.

In step 160, the target yaw moment Mt and the target longitudinal force Ft are converted to the braking forces Fin and Fout for the wheels at the inside and the outside of the turn. It may be done according to the diagram of FIGS. 2 or 3, as described with respect to step 80, with a modification of Mt and Ft, if necessary, in order to ensure the grip area. However, since the security of the side force is more important in the drift out control than in the spin control, in view of the decrease of the side force due to the braking, it is desirable that the operation area of the brake control is further reduced from the grip area such that the braking forces are in an area of about one third (⅓) of the friction radius, as shown in FIG. 9.

Figure 10:
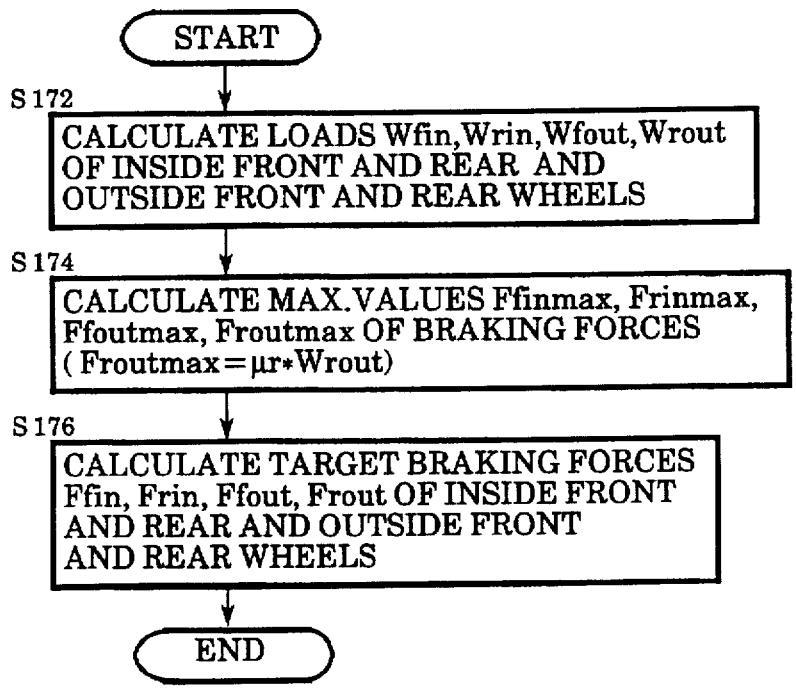
FIG. 10 is a flowchart showing a routine for sharing the braking force between the front wheels and the rear wheels in step 170 of the general flowchart.

In step 170, according to the subroutine of FIG. 10, the braking forces Fin and Four for the wheels at the inside and the outside of the turn are respectively shared for the front and the rear wheels at the inside and the outside of the turn according to the share of loads imposed on the respective wheels, through steps 172, 174 and 176, which are the same as steps 92, 94 and 96, except that the rear wheel at the outside of the turn is no longer given the exceptional share consideration as in step 94 of the spin suppression control.

After the braking forces to be applied to the respective wheels have been determined, in step 180, the brake control system is actuated as already described.

Although the present invention has been described in detail with respect to the some embodiments thereof, it will be apparent for those skilled in the art that various modifications thereof are possible within the scope of the present invention.

I claim:

1. A behavior control system of a vehicle having wheels and a brake system for selectively braking each of said wheels, comprising:

means for detecting a behavior of the vehicle, said behavior including a yaw moment and a longitudinal force of the vehicle;

means for determining a target behavior of the vehicle, said target behavior including a target yaw moment and a target longitudinal force;

means for controlling said brake system so as to approach the behavior of the vehicle to said target behavior including approaching the yaw moment of the vehicle to said target yaw moment and approaching the longitudinal force of the vehicle to the target longitudinal force;

wherein said behavior control system further comprises:

means for judging whether the behavior of the vehicle is in an oversteered condition or an understeered condition, and means for changing between the target yaw moment and the target longitudinal force as a controlling target behavior according to whether the behavior of the vehicle judged by said vehicle behavior judgment means is in the oversteered condition or the understeered condition.

2. A behavior control system according to claim 1, wherein said vehicle behavior detecting means detects vehicle speed, lateral acceleration and yaw rate of the vehicle, and said controlling target behavior change means controls said target behavior determining means so as to determine the target yaw moment substantially based upon a slip angle of the vehicle deduced by calculating a change rate of the lateral acceleration as a difference between the lateral acceleration detected by said vehicle behavior detecting means and a product of the vehicle speed and the yaw rate both detected by said vehicle behavior detecting means, calculating a lateral slip velocity by integrating on time basis the lateral acceleration change rate, and calculating the slip angle as a ratio of the lateral slip velocity to the vehicle speed, when the behavior of the vehicle is judged as being in the oversteered condition.

3. A behavior control system according to claim 2, wherein said target behavior determining means determines the target longitudinal force to be a constant value.

4. A behavior control system according to claim 2, wherein said target yaw moment determining means determines the target yaw moment further based upon a change rate of the slip angle in addition to the slip angle.

5. A behavior control system according to claim 1, wherein said vehicle behavior detecting means detects vehicle speed, steering angle and yaw rate of the vehicle, and said target behavior determining means determines the target longitudinal force substantially based upon a deviation of a yaw rate calculated by a time based integration of a parameter proportional to a product of the vehicle speed and the steering angle both detected by said behavior detecting means from the yaw rate detected by said behavior detecting means, when the behavior of the vehicle is judged as being in the understeered condition.

6. A behavior control system according to claim 5, wherein said target behavior determining means determines the target yaw moment to be a constant value.

7. A behavior control system according to claim 5, wherein said parameter proportional to the product of the vehicle speed and the steering angle is modified by square of the vehicle speed such that said parameter is increased with an additive increment substantially proportional to the square of the vehicle speed.

8. A behavior control system according to claim 1, wherein said target behavior determining means comprises a means for developing a coordinate of the yaw moment and the longitudinal force, a means for determining a grip area in said coordinate, and a means for modifying a target point of the target yaw moment and the target longitudinal force on said coordinate so as to be in said grip area, when not in said grip area, said target point modifying means modifying the target point primarily based upon the target yaw moment rather than on the target longitudinal force when the vehicle behavior is in the oversteered condition.

9. A behavior control system according to claim 1, wherein said target behavior determining means comprises a means for developing a coordinate of the yaw moment and the longitudinal force, a means for determining a grip area in said coordinate, and a means for modifying a target point of the target yaw moment and the target longitudinal force on said coordinate so as to be in said grip area, when not in said grip area, said target point modifying means modifying the target point primarily based upon the target longitudinal force rather than on the target yaw moment when the vehicle behavior is in the understeered condition.

10. A behavior control system according to claim 1, wherein said target behavior determining means comprises a means for developing a coordinate of the yaw moment and of the longitudinal force, a means for determining an area in said coordinate contracted to be substantially one third of a grip area with respect to the yaw moment and the longitudinal force, respectively, and a means for modifying a target point of the target yaw moment and the target longitudinal force on said coordinate so as to be in said contracted area, when not in said contracted area, said target point modifying means modifying the target point primarily based upon the target longitudinal force rather than on the target yaw moment when the vehicle behavior is in the understeered condition.

11. A behavior control system according to claim 1, wherein said vehicle behavior detecting means comprises a means for detecting a friction radius of each of the wheels, and a means for sharing a braking force applied to front and rear left wheels of the vehicle to a braking force applied to the front left wheel and a braking force applied to the rear left wheel at a sharing ratio of the friction radius of the front left wheel versus the friction radius of the rear left wheel, and a means for sharing a braking force applied to front and rear right wheels of the vehicle to a braking force applied to the front right wheel and a bring force applied to the rear right wheel at a sharing ratio of the friction radius of the front right wheel versus the friction radius of the rear right wheel, when the vehicle behavior is in the understeered condition.

12. A behavior control system according to claim 1, wherein said vehicle behavior detecting means comprises a means for detecting a friction radius of each of the wheels, and a means for sharing a braking force applied to front and rear wheels of the vehicle at the inside of a turn thereof to a braking force applied to the front wheel at the inside of the turn and a braking force applied to the rear wheel at the inside of the turn at a sharing ratio of the friction radius of the front wheel at the inside of the turn versus the friction radius of the rear wheel at the inside of the turn, and a means for sharing a braking force applied to front and rear wheels of the vehicle at the outside of the turn thereof to a braking force applied to the front wheel at the outside of the turn and a braking force applied to the rear wheel at the outside of the turn at a sharing ratio of the friction radius of the front wheel at the outside of the turn versus a product of the fiction radius of the rear wheel at the outside of the turn and $(t/2)/(b^2+t^2/4)^{1/2}$, wherein t is a wheel base of the rear wheels and b is a distance between a mass center of the vehicle and a rear wheel axis, when the vehicle behavior is in the oversteered condition.

* * * * *